US 6,533,307 B1

(12) United States Patent
Singh (10) Patent No.: US 6,533,307 B1
(45) Date of Patent: Mar. 18, 2003

(54) LOAD TRANSFER BETWEEN TRACTOR AND TOWED IMPLEMENT

(76) Inventor: Kalvin Jit Singh, 105 Old Te Kujti Road, RD 6, Otorohanga (NZ)

( * ) Notice: Subject to any disclaimer, the term of this patent is extended or adjusted under 35 U.S.C. 154(b) by 0 days.

(21) Appl. No.: 09/719,217

(22) PCT Filed: Jun. 4, 1999

(86) PCT No.: PCT/NZ99/00074

§ 371 (c)(1),
(2), (4) Date: Feb. 23, 2001

(87) PCT Pub. No.: WO99/63800

PCT Pub. Date: Dec. 16, 1999

(30) Foreign Application Priority Data

Jun. 8, 1998 (NZ) .............................. 330600

(51) Int. Cl.⁷ ............................................. B62D 53/00
(52) U.S. Cl. .................................... 280/405.1; 172/439
(58) Field of Search .......................... 280/405.1, 414.5, 280/407, 406.1; 172/326, 324, 325, 463, 466, 465, 439

(56) References Cited

U.S. PATENT DOCUMENTS

| 2,396,576 A | * | 3/1946 | Kelly | ....................... 280/33.44 |
| 3,174,557 A | * | 3/1965 | Newkirk | ..................... 172/319 |
| 3,430,984 A | | 3/1969 | Richardson | |
| 3,485,505 A | * | 12/1969 | Schmidt | ...................... 280/81 |
| 3,517,943 A | * | 6/1970 | Bunting et al. | ............. 280/405 |
| 3,552,772 A | * | 1/1971 | Scott | ........................... 280/405 |
| 3,700,053 A | * | 10/1972 | Glissendorf | ................. 177/136 |
| 4,705,288 A | * | 11/1987 | Schmidt | ................. 280/405 R |
| 4,903,781 A | | 2/1990 | Smit | |
| 5,363,924 A | * | 11/1994 | Foley et al. | ................ 172/326 |

FOREIGN PATENT DOCUMENTS

AU 435297 6/1971

* cited by examiner

Primary Examiner—Lesley D. Morris
Assistant Examiner—Tony Winner
(74) Attorney, Agent, or Firm—Greer, Burns & Crain, Ltd.

(57) ABSTRACT

An apparatus for transferring load between:
 (a) towing tractor which includes:
  (i) a three-point linkage which includes three linkage arms, and associated hydraulic draft control system; and
  (ii) a tow-bar; and
 (b) a towed above ground implement which includes a draw-bar which attaches to the tow-bar of the tractor; characterized in that the apparatus includes a shock absorber which is:
  (iii) connected at one end thereof to at least the two lower arms of the three-point linkage; and
  (iv) at the other end thereof connected to the draw-bar of the towed implement in a manner that allows the draft control system of the tractor to be activated so as to transfer load between the tractor and the implement, as is required to maintain the desired wheel slippage of the traction axle of the tractor while towing the implement.

28 Claims, 4 Drawing Sheets

LOAD TRANSFER BETWEEN TRACTOR AND TOWED IMPLEMENT

TECHNICAL FIELD

Apparatus for transferring load between a towing tractor and a towed above ground implement.

BACKGROUND ART

At present problems are often encountered when tractors are used for towing above ground implements such as seed drills, scoops, large trailers and cultivating discs. In general, these problems arise due to the tractor and/or towed implement encountering:

Obstructions e.g. rocks

Muddy or wet ground

Hills or hollows

The above situations cause problems as they can adversely affect the traction of the tractor's driving wheels and render the towing of such implements a dead weight dragging operation.

The above difficulties are currently overcome by using tractors which have:

Ballast added; or

Increased horse power/weight; and/or

Four wheel drive; and/or

Dual wheels.

However, as will be appreciated the above remedies suffer from either increasing the cost of the tractor required to perform the job, or adding time and effort to the job due to having to add ballast to the tractor.

In relation to underground working implements such as ploughs and rotary hoes, the above mentioned difficulties for towed implements have been overcome by the implementation of a hydraulic draft control system associated with the three-point linkage of a tractor. The draft control system operates by either raising or lowering the implement depending on whether its effective load has bee increased or decreased. By this means, the draft control system is able to transfer load (weight) between the implement and tractor to maintain the desired degree of wheel slippage.

It would therefore be an advantage if there could be provided some means by which the draft control system already present on many tractors could be utilised in the towing of above ground implements also.

It is an object of the present invention to address the foregoing problems or at least to provide the public with a useful choice.

Further aspects and advantages of the present invention will become apparent from the ensuing description which is given by way of example only.

DISCLOSURE OF INVENTION

According to one aspect of the present invention there is provided apparatus for transferring load between:

a towing tractor which includes:
  a) a three-point linkage which includes three linkage arms; and associated hydraulic draft control system; and
  b) a tow-bar; and a towed above ground implement which includes a draw-bar which attaches to the tow-bar of the tractor, characterised in that the apparatus includes a shock absorber which is:

(i) directly or indirectly connected at one end thereof to at least the two lower arms of the tractor's three-point linkage, and (ii) at the other end thereof is connected either directly or indirectly to the draw-bar of the towed implement in a manner that allows the draft control system of the tractor to be activated so as to transfer load between the tractor and the implement, as is required to maintain the desired wheel slippage of the tractor's traction axle whilst towing the implement.

According to one aspect of the present invention there is provided apparatus for transfering load between:

a towing tractor which includes:
  a) a three-point linkage which includes three linkage arms; and associated hydraulic draft control system; and
  b) a tow-bar; and a towed above ground implement which includes a draw-bar which attaches to the tow-bar of the tractor;

characterised in that the apparatus includes a shock absorber which is:

i) directly or indirectly connected to the three arms of the tractor's three-point linkage, and ii) at the other end thereof is connected either directly or indirectly to the draw bar of the towed implement in a manner that allows:

the shock absorber to experience a force which is forward of the towed implement; and the draft control system of the tractor to be activated so as to transfer load between the tractor and the implement, as is required to maintain the desired wheel slippage of the tractor's traction axle whilst towing the implement;

such that load from the towed implement can be transferred to all the wheels of the tractor.

According to another aspect of the present invention there is provided a method of transferring load between:

a towing tractor which includes:
  a) a three-point linkage which includes three linkage arms and associated hydraulic control system; and
  b) a tow-bar; and a towed above ground implement which includes a draw-bar which attaches to the tow-bar of the tractor;

the method characterised by the steps of:

(i) directly or indirectly connecting a shock absorber to at least the two lower arms of the tractors three-point linkage, and (ii) connecting the opposite end of the shock absorber to the draw-bar of the towed implement in a manner that allows the draft control system of the tractor to be activated, and (iii) tensioning the shock absorber by raising or lowering the tractor's three-point linkage arms so as to enable the transfer of load between the tractor and the implement, such as required to maintain the desired wheel slippage of the tractor's traction axle while towing the implement.

According to a further aspect of the present invention there is provided a method of transferring load between:

a towing tractor which includes:
  a) a three-point linkage which includes three linkage arms and associated hydraulic control system; and
  b) a tow-bar; and a towed above ground implement which includes a draw-bar which attaches to the tow-bar of the tractor;

the method characterised by the steps of:

(i) directly or indirectly connecting a shock absorber to the three arms of the tractors three-point linkage, and (ii) connecting the opposite end of the shock absorber to the draw-bar of the towed implement in a manner that allows:

the shock absorber to experience a force which is forward of the towed implement; and the draft control system of the tractor to be activated, such that load from the towed implement can be transferred to all wheels of the tractor, and (iii) tensioning the shock absorber by raising or lowering the tractor's three-point linkage arms so as to enable the transfer of load between the tractor and the implement, such as required to maintain the desired wheel slippage of the tractor's traction axle while towing the implement.

It is envisaged that the towing tractor may be any tractor with the characteristics referred to above.

The towed above ground implement may include:

Trailers

Scoops

Seed drills

Cultivating discs

However, this list should not be seen as limiting as the present invention may also be applied to other implements which are attached to the tow-bar of the tractor.

The shock absorber may come in a variety of different forms.

In general, the shock absorber should be capable of supporting a 3–4 ton load.

In some embodiments the shock absorber may be a gas strut or hydraulic ram.

In other embodiments the shock absorber may be a helical spring or other resilient-type member/device.

In preferred embodiments the shock absorber may be a leaf spring.

For ease of reference only, the shock absorber will now be referred to as being a leaf spring. However, it should be appreciated that the principles stated for this embodiment may also have general application to other embodiments where the shock absorber is not a leaf spring.

The leaf spring may be connected to at least the two lower arms of the tractor's three-point linkage in a variety of different ways.

In general, the leaf spring may be attached to these arms via a mounting-frame which connects to the terminal ends of the tractors linkage arms.

In preferred embodiments, the mounting-frame may connect to all three arms of the three-point linkage.

In some preferred embodiments, the leaf spring may be pivotally attached to the mounting-frame so as to allow for any lateral movement of the towed implement. In general, the applicant has found this is best achieved by having the leaf spring pivot along the same axis, as that which the draw-bar of the implement pivots with respect to the tow-bar of the tractor.

In other preferred embodiments the leaf spring is fixedly attached to the mounting-frame but is connected to the draw-bar of the towed implement in a manner which caters for any lateral movement of the towed implement.

The leaf spring may be connected to the draw-bar of the towed implement in a variety of different ways. In general, the leaf spring should be connected to the draw-bar so that a pre-set tension can always be maintained on the leaf spring through operation of the draft control system.

In preferred embodiments, the leaf spring may be directly or indirectly connected to the draw-bar of the tractor via at least one chain.

In some other embodiments the leaf spring may be directly or indirectly connected to the draw-bar of the tractor via at least one length of wire rope.

Other methods/devices for attaching the leaf spring to the draw-bar are of course envisaged.

For ease of reference only, the leaf spring may now be thought of as being indirectly or directly connected to the draw-bar by at least one chain.

In preferred embodiments (where the leaf spring is pivotally attached to the mounting-frame), a chain may directly attach the leaf spring to the draw-bar. In such embodiments the length of the chain should be roughly equivalent to half of the distance, by which the draft control system can raise or lower the three-point linkage arms. This length of chain has been found by the applicant to allow the leaf spring to retain a tensioned connection to the draw-bar of the towed implement, whilst the implement is being lifted, or lowered, by the draft control system.

In preferred embodiments (where the leaf spring is fixedly attached to the mounting-frame), a first chain may connect the leaf spring to a bell crank (i.e. a pivoting device) which is attached to the tow-bar of the tractor. The bell crank being positioned forward of the point where the first chain is attached to the leaf spring. Attached to the other side of the bell crank may be a second chain which is connected to a substantially vertically inclined chain attachment arm, extending from the draw-bar of the towed implement. In such embodiments it is important that the second chain be connected to the bell crank in a manner that allows it to vertically and horizontally pivot. In preferred embodiments, this may be achieved via a shackle arrangement situated above the point where the draw-bar of the implement pivots with respect to the tow-bar of the tractor.

The applicant has found one advantage of preferred embodiments such as this, is that the two chain arrangement can help ensure the pre-set tension is always maintained on the leaf spring—even when the particular type of draft control system employed by a tractor is not especially sensitive.

Another advantage of such preferred embodiments is that should the hitchpin (connecting the tractor tow-bar to the implement draw-bar), break the second chain can function as a safety chain. This is because the second chain (where connected to the tractor) has a center of gravity positioned similarly to that of the draw-bar. Furthermore, the applicant has found preferred embodiments such as this allow the leaf spring to experience a forward force so as to enable the load from the towed implement to be transferred to all the wheels of the tractor (i.e. including the front "steering" wheels).

In order to allow the draft control system to be activated via an increase or decrease in the effective towed load, the leaf spring should be attached to the draw-bar and tensioned (by rang or lowering the three-point linkage arms) so the leaf spring is capable of experiencing:

(i) a vertical load; and (ii) a rearward load with respect to the direction in which the implement is being towed.

The above requisites for attaching the leaf spring to the draw-bar ensure it is able to absorb any vertical forces associated with a change in the effective load of the implement, as well as relay a rearward load on the lower arms of the three-point linkage. It being the rearward load on the three-point linkage which activates the draft control sensing valves which in turn activate the hydraulic draft control system.

In embodiments where the leaf spring is pivotally mounted to the mounting-frame, the above tensioning objectives may be achieved by attaching the chain to both the leaf spring and the draw-bar—such that it has an angle substantially between 30–75 degrees with respect to the draw-bar. Preferably in such embodiments this angle may be substantially 45 degrees with respect to the implements draw-bar.

In embodiments where the leaf spring is fixedly attached to the mounting frame, the above tensioning objectives may be achieved by having different attachment points for attaching the second chain to the chain-attachment arm on the implement draw-bar. For example if a light tractor is towing a heavy implement the chain should be attached to the chain-attachment arm so that it is further away from the draw-bar, and vice versa—if it is a heavy tractor and light towed implement. In general the attachment points on the chain-attachment arm should be capable of allowing the second chain to have an angle of substantially between 15 degrees to 45 degrees with respect to the draw-bar.

To assist the farmer in repeatedly setting the leaf spring to the correct tension whenever a particular towed implement is connected to the tow-bar of the tractor, the leaf spring may be attached to a load scale indicator device. The load scale indicator device being capable relaying the degree of tension that is being applied to the leaf spring. Consequently, once the farmer has initially experimented towing the implement at different leaf spring tensions; once the correct tension for that implement is found the farmer simply records this for future reference. Thus, the next time this implement is towed the farmer uses the load scale indicator device to set the leaf spring tension to that used previously.

In general, the load scale indicator device may be a spring-balance which is configured so that it is operated via a load being applied to the leaf spring Of course this should not be seen as limiting as other forms of load scale indicator device are envisaged.

In preferred embodiments the load scale indicator device is also designed to relay to a farmer when the leaf spring or draft control system has reached, or is approaching, an overload condition.

Thus preferred embodiments of the present invention may have a number of advantages over the prior art which may include:

1. It allows the driver of a tractor to select the desired wheel slippage via the draft control system once the apparatus of the present invention has been connected to both the tractor's three-point linkage and the towed implement.
   When the implement is being towed the present invention is then able to convince the hydraulic draft control system of the tractor to believe there is an underground implement in use. Consequently, the draft control system is able to lift or lower the draw-bar of the towed implement so as to transfer load between the implement and the traction axle of the tractor. This load transfer therefore allows the tractor to maintain the desired wheel slippage when external factors such as hills, rocks or muddy ground for example are encountered.
2. It can provide a cost-effective means for overcoming the difficulties currently experienced with towing above ground implements. Thus there is no need to:
   a) add ballast to the tractor;
   b) increase the size or horsepower of the tractor;
   c) have a four wheel drive and/or dual wheel tractor; as was previously required.
3. Once the apparatus is set up, no further input from the driver of the tractor is required, as the shock absorber and draft control system automatically act to maintain the desired wheel slippage for the tractor.
4. It can transfer load from the towed implements to all the wheels of the tractor (i.e. including the front "steering" wheels).
5. It can increase the productivity of a tractor driver as there is no longer a requirement to add or remove ballast to the tractor. In addition, as no further weight is being added to the tractor (over and above the towed load) fuel consumption is not increased by the present invention.

BRIEF DESCRIPTION OF DRAWINGS

Further aspects of the present invention will become apparent from the following description which is given by way of example only and with reference to the accompanying drawings in which.

BEST MODES FOR CARRYING OUT THE INVENTION

Figure 1:
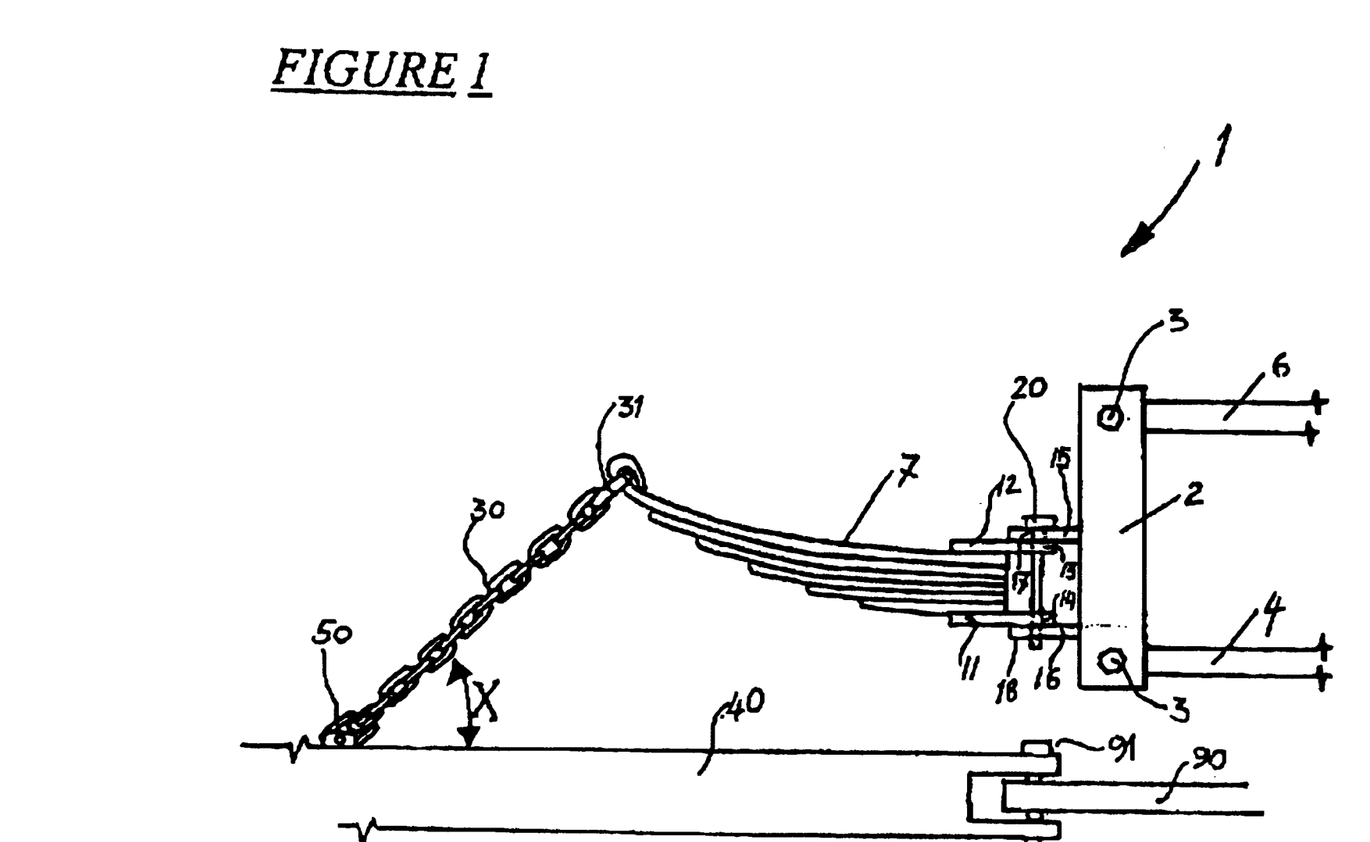
FIG. 1 is a diagrammatic side view of one preferred embodiment of the present invention where the leaf spring is pivotally attached to the mounting frame.
Figure 2:
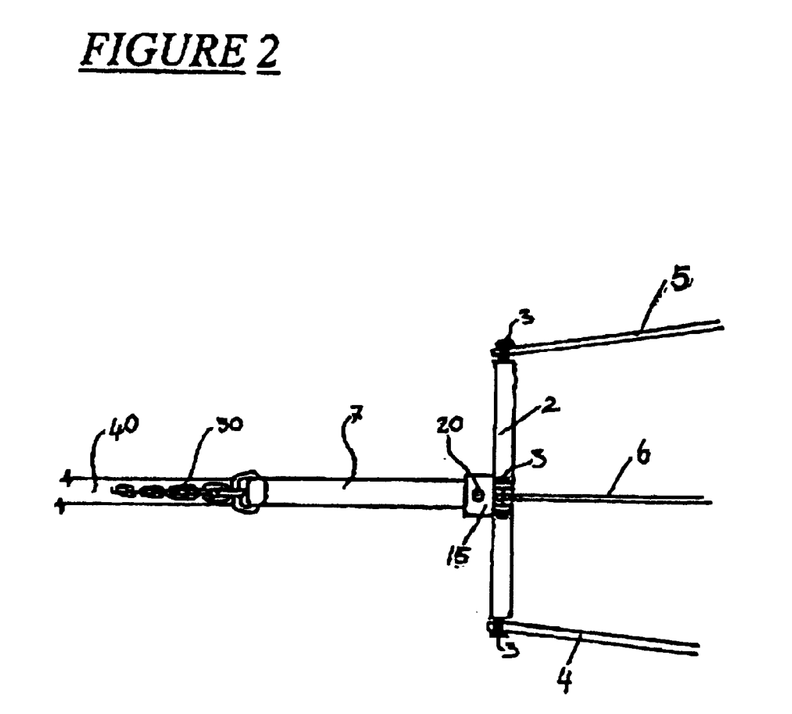
FIG. 2 is a diagrammatic plan view of the embodiment shown in FIG. 1.
Figure 3:
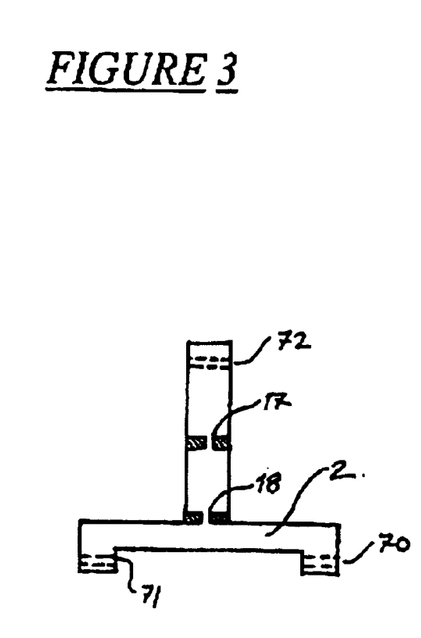
FIG. 3 is a diagrammatic rear view of the mounting-frame used in the embodiment shown in FIG. 1.

With respect to FIGS. 1 to 3 there is provided apparatus for transferring load generally indicated by arrow 1. The apparatus 1 includes a mounting-frame 2 which is connected via bolts 3 to the three-point linkage arm 4, 6 and 6 of a tractor (not shown) via apertures 70,71 and 72 shown in FIG. 3.

A shock absorber in the form of a leaf spring 7 is pivotally attached to the mounting frame 2 via its end plates 11 and 12 which have aligned apertures 13 and 14.

The end plates 11 and 12 fit within horizontal plates 15 and 16 on the mounting-frame 2 which also have aligned apertures 17 and 18. When the apertures 13, 14 and 17, 18 are aligned a pin 20 passes therethrough about which the leaf spring 7 may pivot.

The opposite end of leaf spring 7 is attached to a chain 30 via a D-shackle 31. The other end of the chain may be attached to a draw-bar 40 of an above ground implement (not shown) via a D-shackle arrangement 50. However, it should be appreciated that other means of attaching the chain to the draw-bar 40 are envisaged. The draw-bar 40 is attached to the tow-bar 90 of the tractor (not shown) via a hitch-pin 91.

In the embodiment shown, the angle of the chain 30 indicated by double-headed arrow X is substantially 45 degrees with respect to the draw-bar 40.

In order to set the leaf spring 7 to the correct tension for enabling load transfer from the implement to the tractor to occur, simply requires raising or lowering the three-point linkage arms 4, 5 and 6 of the tractor until the desired tension is achieved.

Figure 4:
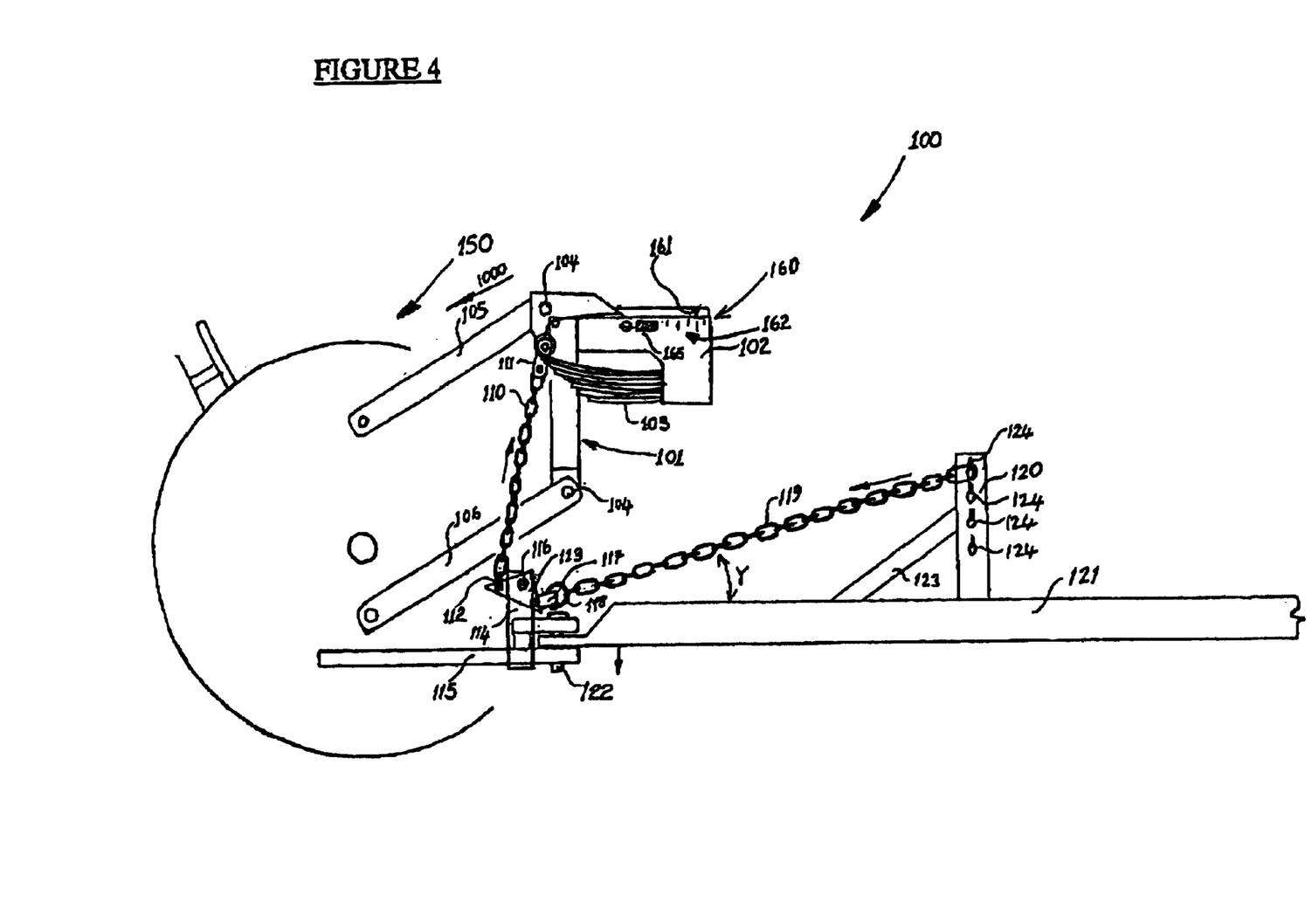
FIG. 4 is a diagrammatic side view of one preferred embodiment of the present invention where the leaf spring is fixedly attached to the mounting frame.

With respect to FIG. 4 there is provided apparatus for transferring load generally indicated by arrow 100. The apparatus 100 includes a mounting frame 101 which is substantially similar to that shown in FIGS. 1 to 3; except that it includes a rearward facing portion 102 to which a shock absorber in the form of a leaf-sprig 103 is fixedly attached via bolts (not shown).

The mounting frame 101 is connected via bolts 104 to the three-point linkage arms 105, 106 and 107 (the latter not being shown) of a tractor 150. The bolts 104 passing through apertures (not shown) in the mounting frame 101.

The opposite end of the leaf spring 103 (to that attached to the rearward portion 102 of the mounting frame 101), connects to a first chain 110. The first chain 110 is connected to the leaf spring 103 via a shackle 111. The other end of the chain 110 is connected via a shackle 112 to one side of a bell crank 113. The bell crank is connected via an arm 114 to the tow-bar 115 of tractor 150. The bell crank 113 pivots about a pin 116. The other side of the bell crank is connected to a horizontally orientated D-shackle 117 to which is connected a substantially vertically inclined ring 118 which connects to one end of a second chain 119. The other end of chain 119 is connected via a chain-attachment arm 120 to the draw-bar 121 of a towed implement not shown. The chain-attachment arm 120 is braced by a brace arm 123.

The draw-bar 121 is attached to the tow-bar 115 of the tractor 150 via a hitchpin 122.

The second chain 119 is attached to the chain-attachment arm 120 via at least one hook 124 of a series of such hooks spatially located on the attachment arm 120.

In the embodiment shown, the angle of the chain indicated by double beaded arrow Y is substantially 30 degrees with respect to the draw-bar 121.

In order to set the leaf spring to the correct tension (for load transfer from the implement to the tractor to occur) simply requires:

a) raising the three-point linkage arms 105, 106 and 107 of the tractor 150 until the desired tension is achieved or almost achieved, and b) if necessary altering the hook 124 by which the second chain 119 attaches itself to the chain attachment arm 120 to achieve the desired tension.

Once the correct tension has been set for the first time with respect to an implement, a farmer simply needs to make a note of the reading being indicated by a load scale indicator device 160. The load scale indicator device including an indicator 161 and scale 162. The load scale indicator device 160 being configured so that tension on the leaf spring 103 causes the indicator 161 to move with respect to the load scale 162.

The load scale 162 also includes a shaded region 165 which indicates when either the leaf spring or tractors draft control is approaching an overload condition indicated by the symbol θ.

One advantage the Applicant has found that the configuration of the apparatus 100 has is that load can be transferred from the towed implement to all the wheels of the tractor 150 (ie including the front "steering" wheels). As the Applicant has found this configuration enables the leaf spring to experience a force indicated by arrow 1000 which is forward of the towed implement. This is due to the bell crank 113 being positioned forward of the point where the first chain 110 is attached to the leaf spring 103.

Figure 5:
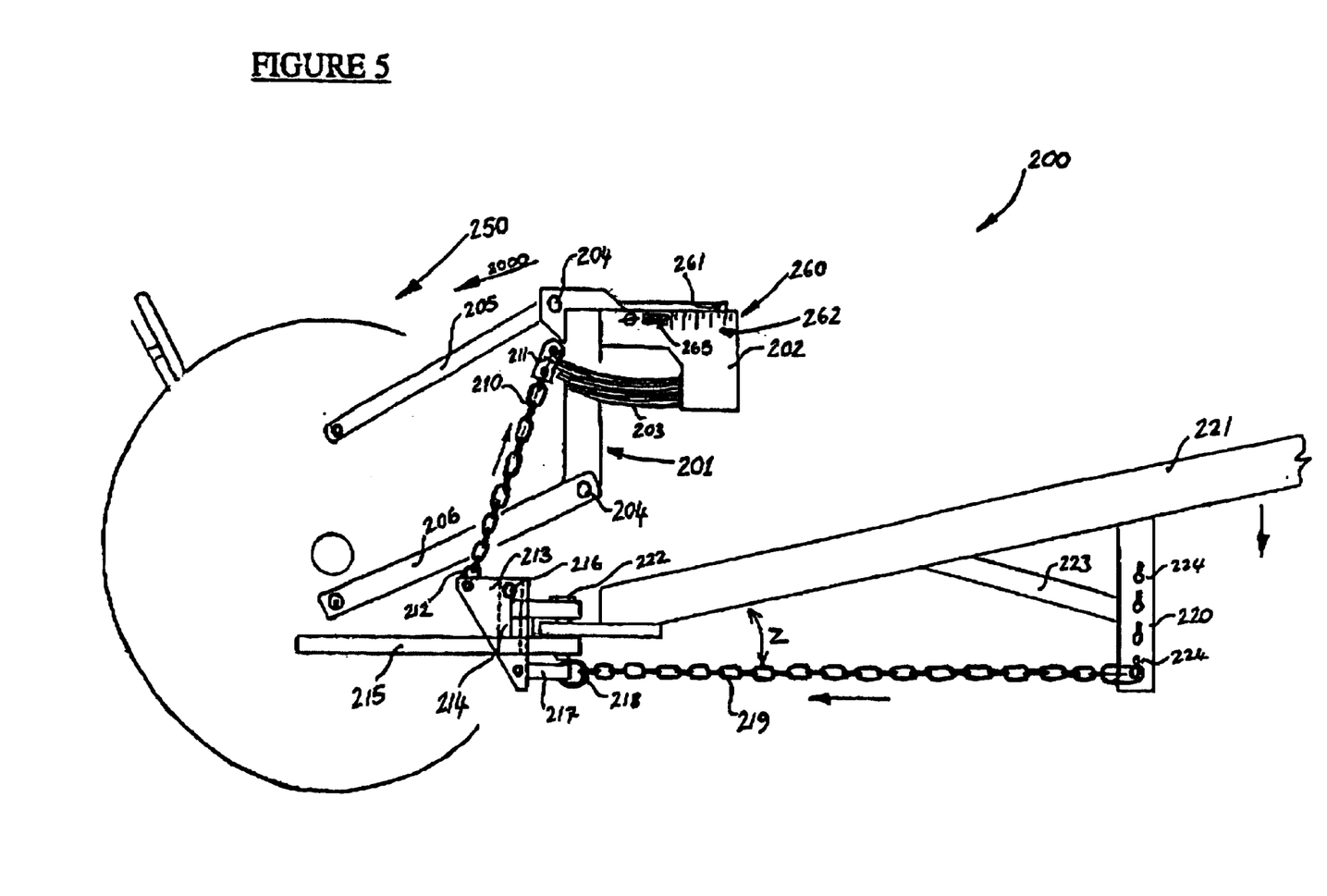
FIG. 5 is a diagrammatic side view of another preferred embodiment of the present invention where the leaf spring is fixedly attached to the mounting frame.

With respect to FIG. 5 there is provided apparatus for transferring load generally indicated by arrow 200. The apparatus 200 includes a mounting frame 201 which is substantially similar to that shown in FIGS. 1 to 3 except that it includes a rearward facing portion 202 to which a shock absorber in the form of a leaf-spring 203 is fixedly attached via bolts (not shown).

The mounting fame 201 is connected via bolts 204 to the three-point linkage arms 205, 206 and 207 (the later not being shown) of a tractor 250. The bolts 204 passing through apertures (not shown) in the mounting frame 201.

The opposite end of the leaf spring 203 (to that attached to the rearward portion 202 of the mounting frame 201), is a first chain 210. The first chain 210 is connected to the leaf spring 203 via a shackle 211 The other end of the chain 210 is connected via a shackle 212 to one side of a bell crank 213. The bell crank is connected via an arm 214 to the tow-bar 215 of tractor 260. The bell crank 213 pivots about a pin 216. The other side of the bell crank is connected to a horizontally orientated D-shackle 217 to which is connected to a substantially vertically inclined ring 218 which connects to one end of a second chain 219. The other end of chain 219 is connected via a chain-attachment arm 220 to the draw-bar 221 of a towed implement not shown. The chain-attachment arm 220 is braced by a brace arm 223.

The draw-bar 221 is attached to the tow-bar 216 of the tractor 250 via a hitchpin 222.

The second chain 219 is attached to the chain-attachment arm 220 via at least one hook 224 of a series of such hooks spatially located on the attachment arm 220.

In the embodiment shown, the angle of the chain indicated by double headed arrow Z is substantially 30 degrees with respect to the draw-bar 221.

In order to set the leaf spring to the correct tension (for load transfer from the implement to the tractor to occur) simply requires:

a) raising the three-point linkage arms 205, 206 and 207 of the tractor 250 until the desired tension is achieved or almost achieved, and b) if necessary altering the hook 224 by which the second chain 219 attaches itself to the chain attachment arm 220 to achieve the desired tension.

Once the correct tension has been set for the first time with respect to an implement, a farmer simply needs to make a note of the reading being indicated by a load scale indicator device 260. The load indicator scale device including an indicator 261 and load scale 262. The load scale indicator device 260 being configured so that tension on the leaf spring 203 causes the indicator 261 to move with respect to the load scale 262.

The load scale 262 also includes a shaded region 265 which indicates when either the leaf spring or tractors draft control is approaching an overload condition indicated by the symbol θ.

One advantage the Applicant has found that the configuration of the apparatus 200 has is that load can be transferred from the towed implement to all the wheels of the tractor 250 (i.e. including the front "steering" wheels). As the Applicant has found this configuration enables the leaf spring to experience a force indicated by arrow 2000 which is forward of the towed implement. This is due to the bell crank 213 being positioned forward of the point where the first chain 210 is attached to the leaf spring 203.

In FIGS. 4 and 5, the unnumbered arrows indicate the direction of forces created by the load transfer apparatus.

Aspects of the present invention have been described by way of example only and it should be appreciated that modifications and additions may be made thereto without departing from the scope of the appended claims.

What I claim is:

1. An apparatus for transferring load between a towing tractor which includes a three-point linkage which includes three linkage arms, an associated hydraulic draft control system, and a tow-bar, and a towed above ground implement which includes a draw-bar which attaches to the tow-bar of the tractor, said apparatus comprises:

a shock absorber which is:
(i) connected at one end thereof to at least the two lower arms of the tractor's three-point linkage;
(ii) at the other end thereof is connected to the draw-bar of the towed implement in a manner that allows the draft control system of the tractor to be activated so as to transfer load between the tractor and the implement, as is required to maintain the desired wheel slippage of the tractor's traction axle while towing the implement; and
(iii) configured to absorb any vertical forces associated with a change in the effective load of the implement.

2. The apparatus as claimed in claim 1 wherein the shock absorber is a leaf spring.

3. The apparatus as claimed in claim 2 wherein the leaf spring is attached to at least the two lower arms of the three-point linkage via a mounting-frame which connects to the terminal ends of the linkage arms.

4. The apparatus as claimed in claim 3 wherein the leaf spring is fixedly attached to the mounting-frame so as to connect to the draw-bar of the towed implement in a manner which caters for any lateral movement of the towed implement.

5. The apparatus as claimed in claim 4 wherein the leaf spring is pivotally attached to the mounting-frame so as to allow for any lateral movement of the towed implement.

6. The apparatus as claimed in claim 5 wherein the leaf spring pivots along the same axis as that which the draw-bar of the implements pivots, with respect to the tow-bar of the tractor.

7. The apparatus as claimed in claim 5 wherein a chain directly attaches the leaf spring to the draw-bar of the towed implement.

8. The apparatus as claimed in claim 7 wherein the length of chain is roughly equivalent to half the distance, which the draft control system can raise or lower the three-point linkage arms.

9. The apparatus as claimed in claim 5 wherein the leaf spring is connected to the draw-bar via a chain having an angle of substantially between 30 and 75 degrees with respect to the draw-bar.

10. The apparatus as claimed in claim 9 wherein this angle is substantially 45 degrees with respect to the implement's draw-bar.

11. The apparatus as claimed in claim 2 wherein the leaf spring is attached to all three arms of the three point linkage via a mounting-frame which connects to the terminal ends of the linkage arms.

12. The apparatus as claimed in claim 11 wherein the leaf spring is fixedly attached to the mounting-frame so as to connect to the draw-bar of the towed implement in a manner which caters for any lateral movement of the towed implement.

13. The apparatus as claimed in claim 2 wherein the leaf spring is connected to the draw-bar so that a preset tension can always be maintained on the leaf spring through operation of the draft control system.

14. The apparatus as claimed in claim 13 wherein the leaf spring may be directly or indirectly connected to the draw-bar of the tractor via at least one chain.

15. The apparatus as claimed in claim 13 wherein the leaf spring is directly or indirectly connected to the draw-bar of the tractor via at least one length of wire rope.

16. The apparatus as claimed in claim 1 wherein the shock absorber is attached to a load scale indicator device.

17. The apparatus as claimed in claim 16 wherein the load scale indicator is any device capable of relaying the degree of tension that is being applied to the shock absorber.

18. The apparatus as claimed in claim 16 wherein the load scale indicator device is designed to relay to a farmer when the shock absorber or draft control system has reached, or is approaching, an overload condition.

19. An apparatus for transferring load between a towing tractor which includes a three-point linkage which includes three linkage arms, an associated hydraulic draft control system, and a tow-bar, and a towed above ground implement which includes a draw-bar which attaches to the tow-bar of the tractor, said apparatus comprises:

a shock absorber which is:
(i) a leaf spring;
(ii) configured such that a first chain connects said leaf spring to a bell crank which is attached to the tow-bar of the tractor;
(iii) attached to all three arms of the three-point linkage via a mounting-frame which connects to the terminal ends of the linkage arms;
(iv) fixedly attached to the mounting-frame so as to connect to the draw-bar of the towed implement in a manner which caters for any lateral movement of the towed implement; and
(v) at the other end thereof is connected to the drew-bar of the towed implement in a manner that allows the draft control system of the tractor to be activated so as to transfer load between the tractor and the implement, as is required to maintain the desired wheel slippage of the tractor's traction axle while towing the implement.

20. The apparatus as claimed in claim 19 wherein attached to the other side of the bell crank is a second chain which is connected to a substantially vertically inclined chain attachment arm, extending from the draw-bar of the towed implement.

21. The apparatus as claimed in 20 wherein the second chain is attached to a chain attachment arm on the implement draw-bar, said chain attachment arm having a number of different attachment points to which the second chain can be attached.

22. The apparatus as claimed in claim 21 wherein the second chain is attached to the chain attachment arm so as to have an angle substantially between 15 degrees to 45 degrees with respect to the draw-bar of the implement.

23. The apparatus as claimed in claim 19 wherein the second chain is connected to the bell crank in a manner that allows the chain to vertically and horizontally pivot.

24. The apparatus as claimed in claim 23 wherein the second chain is able to vertically and horizontally pivot via a shackle arrangement situated above the point where the draw-bar of the implements pivots with respect to the tow-bar of the tractor.

25. A method of transferring load between a towing tractor which includes a three-point linkage which includes three linkage arms, an associated hydraulic draft control system, and a tow-bar, and a towed above ground implement which includes a draw-bar which attaches to the tow-bar of the tractor, said method characterized by the steps of:

(i) directly or indirectly connecting a shock absorber to at least the two lower arms of the tractor's three-point linkage;
(ii) connecting the opposite end of the shock absorber to the draw-bar of the towed implement in a manner that allows the draft control system of the tractor to be activated and enable the shock absorber to absorb any vertical forces associated with a change in the effective load of the implement; and (iii) tensioning the shock absorber by raising or lowering the tractor's three-point linkage arms so as to enable the transfer of load between the tractor and the implement, such as required to maintain the desired wheel slippage of the tractor's traction axle while towing the implement.

26. A method of transferring load between a towing tractor which includes a three-point linkage which includes three linkage arms, an associated hydraulic draft control system, and a tow-bar, and a towed above ground implement which includes a; draw-bar which attaches to the tow-bar of the tractor, said method characterized by the steps of:

(i) directly or indirectly connecting a shock absorber to at least the two lower arms of the tractor's three-point linkage;

(ii) connecting the opposite end of the shock absorber to the draw-bar of the towed implement in a manner that allows;
the shock absorber to experience a forward force; and
the draft control system of the tractor to be activated, such that load from the towed implement can be transferred to all wheels of the tractor; and (iii) tensioning the shock absorber by raising or lowering the tractor's three-point linkage arms so as to enable the transfer of load between the tractor and the implement, such as required to maintain the desired wheel slippage of the tractor's traction axle while towing the implement.

27. An apparatus for transferring load between a towing tractor which includes a three-point linkage which includes three linkage arms, an associated hydraulic draft control system, and a tow-bar, and a towed above ground implement which includes a draw-bar which attaches to the tow-bar of the tractor, said apparatus comprises:

a shock absorber which is:

(i) connected at one end thereof to at least the two lower arms of the tractor's three-point linkage;

(ii) connected at the other end thereof to the draw-bar of the implement such that a pre-set tension can always be maintained on said shock absorber through operation of the draft control system;

(iii) configured to be capable of experiencing a vertical load and a rearward load with respect to the direction in which the implement is being towed;

(iv) configured to absorb any vertical forces associated with a change in the effective load of the implement; and (v) configured to relay the rearward load on the lower arms of the three-point linkage which activates the draft control system.

28. An apparatus for transferring load between a towing tractor which includes a three-point linkage which includes three linkage arms, an associated hydraulic draft control system, and a tow-bar, and a towed above ground implement which includes a draw-bar which attaches to the tow-bar of the tractor, said apparatus comprises:

a shock absorber which is:

(i) directly or indirectly connected to the three arms of the tractor's three-point linkage; and (ii) at the other end thereof connected either directly or indirectly to the draw bar of the towed implement in a manner that allows:
the shock absorber to experience a forward force; and
the draft control system of the tractor to be activated so as to transfer load between the tractor and the implement, as is required to maintain the desired wheel slippage of the tractor's traction axle while towing the implement,
such that load from the towed implement can be transferred to all the wheels of the tractor.

* * * * *